(12) United States Patent
Fenger

(10) Patent No.: US 12,104,578 B2
(45) Date of Patent: Oct. 1, 2024

(54) MAIN SHAFT FIXTURE

(71) Applicant: LIFTRA IP APS, Aalborg (DK)

(72) Inventor: Per E. Fenger, Terndurp (DK)

(73) Assignee: LIFTRA IP APS, Aalborg (DK)

( * ) Notice: Subject to any disclaimer, the term of this patent is extended or adjusted under 35 U.S.C. 154(b) by 0 days.

(21) Appl. No.: 18/420,859

(22) Filed: Jan. 24, 2024

(65) Prior Publication Data

US 2024/0209842 A1 Jun. 27, 2024

Related U.S. Application Data

(60) Continuation of application No. 16/452,617, filed on Jun. 26, 2019, now abandoned, which is a division of
(Continued)

(30) Foreign Application Priority Data

Oct. 7, 2014 (DK) .......................... PA 2014 00573
Sep. 4, 2015 (DK) .......................... PA 2015 00527

(51) Int. Cl.
*F03D 80/50* (2016.01)
*B23B 31/10* (2006.01)
(Continued)

(52) U.S. Cl.
CPC ............ *F03D 80/50* (2016.05); *B23B 31/101* (2013.01); *F03D 13/10* (2016.05); *F03D 13/139* (2023.08);
(Continued)

(58) Field of Classification Search
CPC .......... F03D 80/50; F03D 80/70; F03D 13/10; F03D 13/139; B23B 31/101; B23B 31/16;
(Continued)

(56) References Cited

U.S. PATENT DOCUMENTS

| 1,152,271 A | 8/1915 | Bisbee |
| 1,853,255 A | 4/1932 | Borden |

(Continued)

FOREIGN PATENT DOCUMENTS

| DE | 102006013539 A1 | 9/2007 |
| EP | 1101934 A2 | 5/2001 |

(Continued)

*Primary Examiner* — Stephen A Vu
(74) *Attorney, Agent, or Firm* — Bookoff McAndrews, PLLC

(57) ABSTRACT

A main shaft fixture for fixing a main shaft on a wind turbine during installation and repair work on heavy parts of the wind turbine nacelle, in the case where the fixture is formed of several sections for mounting on stable structural parts in the nacelle, including the nacelle's bottom frame. The main shaft fixture has adjustable pressure mandrels with tap shoes, which cause the fixture to be usable regardless of the turbine main shaft geometry, such that it can be mounted without fixing the rotor. The main shaft fixture also has facilities for mounting of a lightweight crane and a self-hoisting crane with a ground-based winch, respectively, as well as a rotor lock which, in combination with actuators of the main shaft fixture, enables the main shaft and the main shaft bearing to be sufficiently displaced vertically from its bearing in the nacelle to service or replace the bearing.

17 Claims, 5 Drawing Sheets

Related U.S. Application Data application No. 15/517,288, filed as application No. PCT/DK2015/000040 on Oct. 6, 2015, now Pat. No. 10,378,518.

(51) Int. Cl.
  *F03D 13/10* (2016.01)
  *B23B 31/16* (2006.01)
  *F03D 80/70* (2016.01)
  *F16C 35/06* (2006.01)

(52) U.S. Cl.
  CPC ............. *B23B 31/16* (2013.01); *F03D 80/70* (2016.05); *F05B 2230/60* (2013.01); *F05B 2230/61* (2013.01); *F05B 2230/80* (2013.01); *F05B 2240/60* (2013.01); *F05B 2260/30* (2013.01); *F05B 2260/31* (2020.08); *F16C 35/062* (2013.01); *F16C 2360/31* (2013.01); *Y02P 70/50* (2015.11); *Y10T 279/1274* (2015.01); *Y10T 279/1291* (2015.01); *Y10T 279/1986* (2015.01)

(58) Field of Classification Search
  CPC ............. F05B 2230/60; F05B 2230/61; F05B 2230/80; F05B 2240/60; F05B 2260/30; F05B 2260/31; F16C 35/062; F16C 2360/31; Y02P 70/50; Y10T 279/1274; Y10T 279/1291; Y10T 279/1986; Y02E 10/72

See application file for complete search history.

(56) References Cited

U.S. PATENT DOCUMENTS

| | | |
|---|---|---|
| 3,494,230 A | 2/1970 | Gast, Jr. |
| 4,623,157 A | 11/1986 | Rohs |
| 4,631,995 A | 12/1986 | Vroenen |
| 5,015,003 A | 5/1991 | Ramunas |
| 7,759,815 B2 | 7/2010 | Christensen |
| 10,378,518 B2 * | 8/2019 | Fenger .................. F03D 13/10 |
| 10,502,195 B2 | 12/2019 | Thomas et al. |
| 2002/0092395 A1 | 7/2002 | Emilian |
| 2010/0021278 A1 | 1/2010 | Stegemann et al. |
| 2010/0139069 A1 | 6/2010 | Daniels et al. |
| 2012/0141292 A1 | 6/2012 | Signore et al. |
| 2012/0217089 A1 | 8/2012 | Fenger |
| 2018/0313330 A1 | 11/2018 | Vanderwalker et al. |
| 2019/0017552 A1 | 1/2019 | Vanderwalker et al. |

FOREIGN PATENT DOCUMENTS

| | | |
|---|---|---|
| EP | 1617075 A1 | 1/2006 |
| EP | 1748182 A2 | 1/2007 |
| JP | S6154846 A | 3/1986 |
| WO | 2014103018 A1 | 7/2014 |

* cited by examiner

MAIN SHAFT FIXTURE

CROSS-REFERENCE TO RELATED APPLICATIONS

This application is a Continuation of U.S. application Ser. No. 16/452,617, filed Jun. 26, 2019, which is a Divisional of U.S. patent application Ser. No. 15/517,288 filed Apr. 6, 2017, which is a 371 of International Patent Application No. PCT/DK2015/000040 filed Oct. 6, 2015, which claims the benefit of priority to Denmark Patent Application No. PA 2015 00527 filed Sep. 4, 2015, and to Denmark Patent Application No. PA 2014 00573 filed Oct. 7, 2014, the contents of which are incorporated herein by reference in their entirety entireties.

BACKGROUND OF THE INVENTION

Field of the Invention

The present invention relates to a main shaft fixture for the fixing of a main shaft on a wind turbine during the execution of installation and repair work in heavy parts of a wind turbine arranged in a nacelle on wind turbines, with the fixture being divided up into a number of sections for installation on stable structural parts in a nacelle in a wind turbine, including the nacelle's bottom frame.

Description of Related Art

During installation and repair work on the nacelle of wind turbines there is often a need to perform fixing of the main shaft of the wind turbine, for example, with the replacement and servicing of a wind turbine gear box, generator or with the replacement of its main bearing, or other heavy structural parts present in the nacelle of the wind turbine. The stated components, which are mutually conjoined and anchored to the nacelle's bottom frame, are stable in an assembled state, but when separation needs to be undertaken during repairs and servicing of the turbine, static instability and imbalance arises, which can lead to the turbine's structural parts being damaged, so that there is a need to fix the wind turbine main shaft.

German Patent Application DE 102006013539 A1 (NOR-DEX ENERGY GMBH) discloses a main shaft fixture for fixing the main shaft on a wind turbine during the execution of installation and repair work on heavy parts that are arranged in the nacelle on wind turbines, with the fixture being divided up into a number of sections for installation on stable structural parts that are found on a wind turbine nacelle, including the bottom frame of the nacelle.

Up to now it has been necessary to halt the turbine, i.e., brake it and fix the rotor with a rotor lock, and then mount an actual fixture to firmly hold the main shaft, subsequent to which servicing of the components in the wind turbine nacelle is able to take place. However, it is inappropriate to have to halt the operation of the wind turbine while the mounting of the main shaft fixture is taking place, as the standstill of the wind turbine during the time that is spent to install the fixture involves a not insignificant operating loss in the form of a lack of energy produced (power). Furthermore, the known main shaft fixtures are relatively inflexible in relation to shaft geometry, which means that in practice nearly just as many different fixtures need to be built and stored as there are shaft geometries that exist, which is inappropriate. In addition, the use of self-hoisting cranes, whose winches are placed on the ground surface near the turbine's tower, is increasing, because the use of such involves large savings in the level of expenses for servicing of wind turbines since the use of large mobile cranes for handling the above-mentioned large and heavy components is made superfluous. This causes however a need for facilities for anchoring the self-hoisting crane with the ground-based winch in the nacelle. However, the self-hoisting winch requires furthermore the presence of a lightweight crane, for the hoisting of snatch blocks, etc., that are to be anchored on/in the nacelle or on the blades of the wind turbine, which poses requirements concerning the facilities for mounting the lightweight crane.

In the event of servicing in particular large wind turbines, it may however be inappropriate to block the main shaft's rotation with an actual rotor lock, but rather be appropriate to simply retain the shaft in position and permit a certain rotation of the shaft, which is possible by turning the blades/nacelle out of the wind so that the shaft via the effects of the wind on the blades only rotates very slowly, or not at all, whereby it is acceptable in terms of safety, to perform service work in the nacelle of the wind turbine concerned.

SUMMARY OF THE INVENTION

Thus, it is the purpose of the invention to specify a main shaft fixture that provide a more universal application in relation to shaft geometry, which moreover does not require halting and fixing of the wind turbine main shaft, but which may however comprise the means for such.

It is further the purpose of the invention to provide a main shaft fixture that in addition offers facilities for the mounting of a self-hoisting crane, with a ground-based winch.

It is by the invention realized that this is possible by a main shaft fixture of the nature specified in the introduction, which is characterised by that the main shaft fixture comprises adjustable pressure mandrels with tap shoes, and said pressure mandrels being displaceable between a passive, withdrawn lockable position where the tap shoes are configured to be located at a distance from the surface of the main shaft and an advanced lockable position where the tap shoes are configured to be engaged with the main shaft and mounting facilities suitable for a lightweight crane.

Considerable flexibility is hereby attained with respect to the main shaft fixture's use for the fixing of main shafts with different geometries on wind turbines, since solely the degree of mobility of the pressure mandrels and the size of the main shaft fixture pose limiting factors for the usability of such. The main shaft fixture is thus both usable for fixing of cylinder-shaped shafts with different diameters and for the fixing of shafts with conical shapes. The main shaft fixture according to the invention is multi-part, and may be mounted on permanent structural parts, preferably the bottom frame of the nacelle, while the rotor of the wind turbine is in operation.

With the intent of being able to use a self-hoisting crane with a ground-based winch together with the main shaft fixture according to the invention, it may comprise mounting facilities for a self-hoisting crane whose winch is placed on the ground surface ground near the foot of the wind turbine.

The advance thereof is that the establishment of facilities for the fixing of the wind turbine's main shaft, as well as the establishment of mounting facilities for the self-hoisting crane with a ground-based winch, take place simultaneously, which saves work processes, and space, which are of great importance, as the space in the nacelle in a wind turbine are most often narrow, and furthermore the main shaft fixture as well as the mounting facilities for a self-hoisting crane in the nacelle normally utilize the same permanent structural parts in the nacelle for anchoring.

With the intent of ensuring easy and rapid establishment of the self-hoisting crane, which requires the hoisting of snatch blocks with wires originating from the ground-based winch with a lightweight crane which is mounted on stable structural parts in the nacelle, the main shaft fixture may comprise mounting facilities for a lightweight crane.

For the purpose of securing the rapid fixing of the main shaft using the main shaft fixture according to the invention, the pressure mandrels may be provided with actuators for displacing and retaining the tap shoes in the passive position and the active position, respectively, alternatively in a selectable position between the passive and the active position.

Time is thereby saved in the displacement of the tap shoes between the passive position, and the active position pressed against the main shaft's surface.

In a more simple form of embodiment of the main shaft fixture according to the invention, the pressure mandrels may be comprised of threaded bolts whose free ends facing the main shaft are furnished with tap shoes, where the threaded bolts work together with threaded holes in relevant sections of the fixture. The pressure mandrels with the tap shoes are hereby displaced by manual turning of the threaded bolts between the passive position and the active position.

With the intent of being able to permit rotation of the main shaft during performance of servicing of a relevant wind turbine and in order to protect the main shaft and the main shaft fixture, slide plates may exist between the opposing sides of the main shaft's surface and the tap shoes.

This enables the main shaft to be fixed in its position by the main shaft fixture, but with the main shaft being permitted to rotate without it being damaged due to the presence of the slide plates.

In a first embodiment of the slide plates, this could comprise the free ends of tap shoes facing against the main shaft being furnished with slide plates, which in the active extended position are engaged with the main shaft.

In a further embodiment, the main shaft fixture may according to the invention comprise a multi-part slide plate working in conjunction with the main shaft to be mounted on the main shaft, where the multi-part slide plate in its mounted state on the main shaft cooperates with the tap shoes.

This enables the tap shoes on the main shaft fixture's pressure mandrel to slide directly on the multi-part slide plate, in the event of a possible rotation of the main shaft caused by the effects of wind on the blades. The tap shoes on the main shaft fixture's pressure mandrels may cooperate with the multi-part slide plate on the main shaft, with or without slideway linings on the opposing sides of the tap shoes facing the main shaft.

In a further embodiment of the main shaft fixture as per the invention, it may comprise a multi-part needle bearing, roller bearing, ball bearing, consisting of a, multi-part inner ring, fastened on the main shaft, and a therewith cooperating multi-part outer ring consisting a number of bowed sub segments according to the number of tap shoes mounted on the opposing side of the tap shoes facing the multi-part inner ring, which in the advanced active position of the pressure mandrels form the outer ring at a distance from the external periphery of the multi-part inner ring, and where a suitable number of needle rollers, rollers or balls are placed between the inner ring and outer ring, and where means are present for retaining the needles, rollers, or balls in position between the inner ring and outer ring.

An actual temporary bearing connection is hereby formed between the main shaft fixture and the main shaft, about which the main shaft is able to rotate.

With the intent of being able to fix the rotor on the wind turbine after it has been braked to a stop, the main shaft fixture according to the invention, may comprise a rotor lock, for fixing the wind turbine rotor.

In a preferred embodiment of the rotor lock, it is comprised of a flange, whose bolt circle geometry corresponds to a bolt circle geometry on the rotor, said flange element being fastened at the ends to the first end of two first beam-shaped brackets extending parallel with, and on each side of the main shaft, said beam shaped brackets belonging to the main shaft fixture, and where the other end of the brackets are pivotally mounted with horizontally oriented bolt connections, on other brackets belonging to the main shaft fixture, which are anchored on the bottom frame of the nacelle.

It is hereby achieved that the rotor can be fixed by introducing a bolt through one or more of the overlapping holes in the bolt circles on the flange fastened to the bottom frame and the bolt circle on the rotor, respectively.

With the intent of being able to perform replacement of the shaft's main bearing, without being forced to dismount the main shaft, the main shaft fixture may furthermore comprise at least a second actuator, between the nacelle's bottom frame and the opposing side of the first beam-shaped brackets facing such and the nearest rotor lock, where the other actuator is movable between a first passive outer position and an active outer position whereby the flange element is moved vertically.

This enables the main shaft to be able to be raised from its bearing hanging in the rotor lock, such that the main bearing of the shaft can be replaced or serviced without the necessity of removing the shaft from the nacelle.

The invention is explained in further detail in the following with reference to the accompanying drawings.

DETAILED DESCRIPTION OF THE INVENTION

Figure 1:
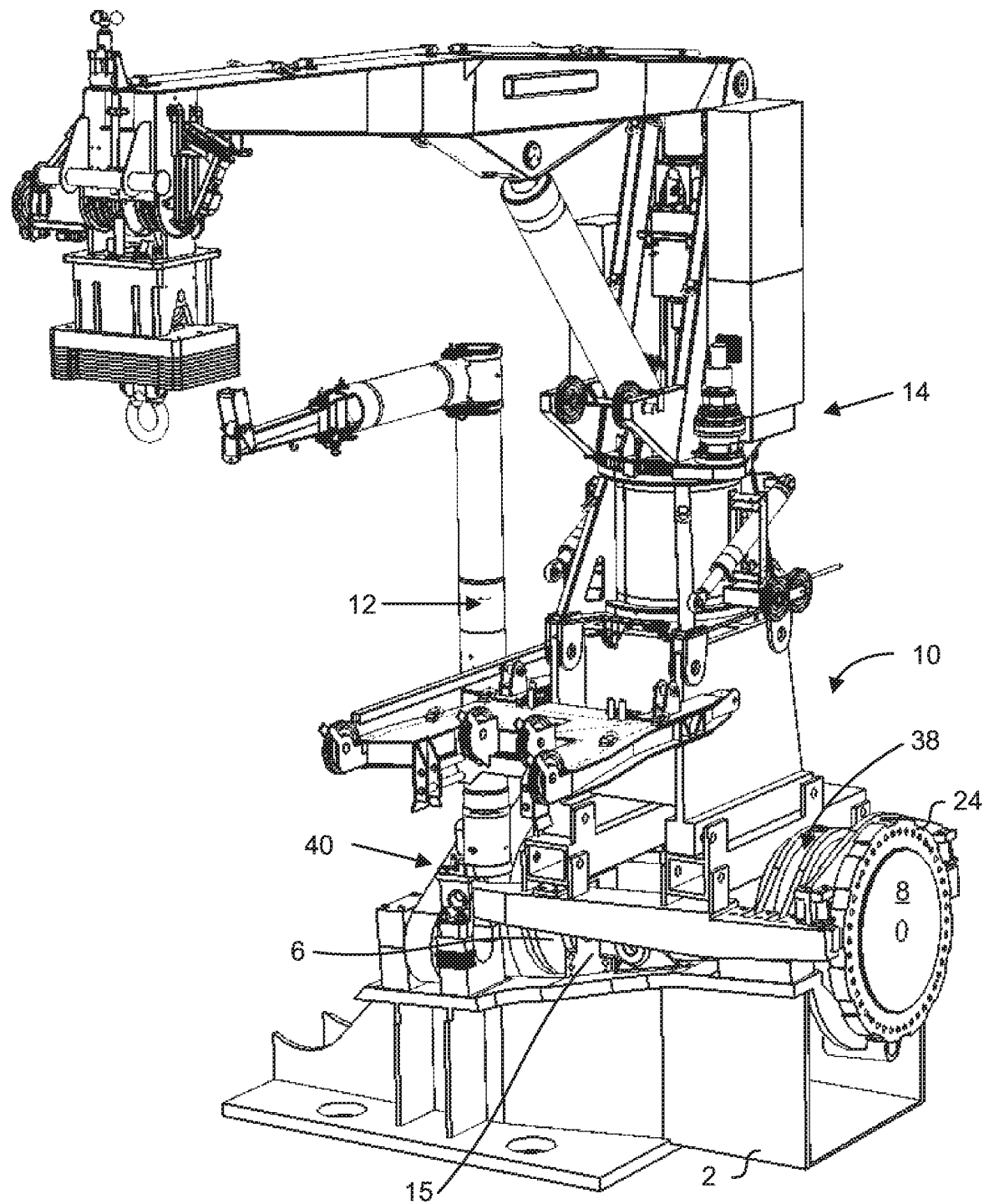
FIG. 1 is a perspective view of parts of a wind turbine nacelle, presenting the nacelle bottom frame, the wind turbine main shaft, and a main shaft fixture according to the invention, with a lightweight crane and a self-hoisting crane mounted.

FIG. 1 shows a bottom frame 2 in a nacelle (not shown) on a wind turbine (not shown), where the main shaft 4 of the turbine, with a gear box 6 and a rotor 8, and where the main shaft fixture 10 according to the invention is shown in the mounted state, bearing a lightweight crane 12 and a self-hoisting crane 14 with a ground-based winch (not shown), respectively. The bottom frame 2 has for reasons of clarity been made transparent.

In the illustrated embodiment, the main shaft fixture 10 is anchored to the bottom frame 2 near the gear box 6 and near the rotor 8, and comprises a multi-part frame 14, which together with a cross member 16 fastened on it encloses a part of the main shaft 4 between the rotor 8 and the gear box 6. The multi-part frame 14 is anchored on the bottom frame 2.

Figure 2:
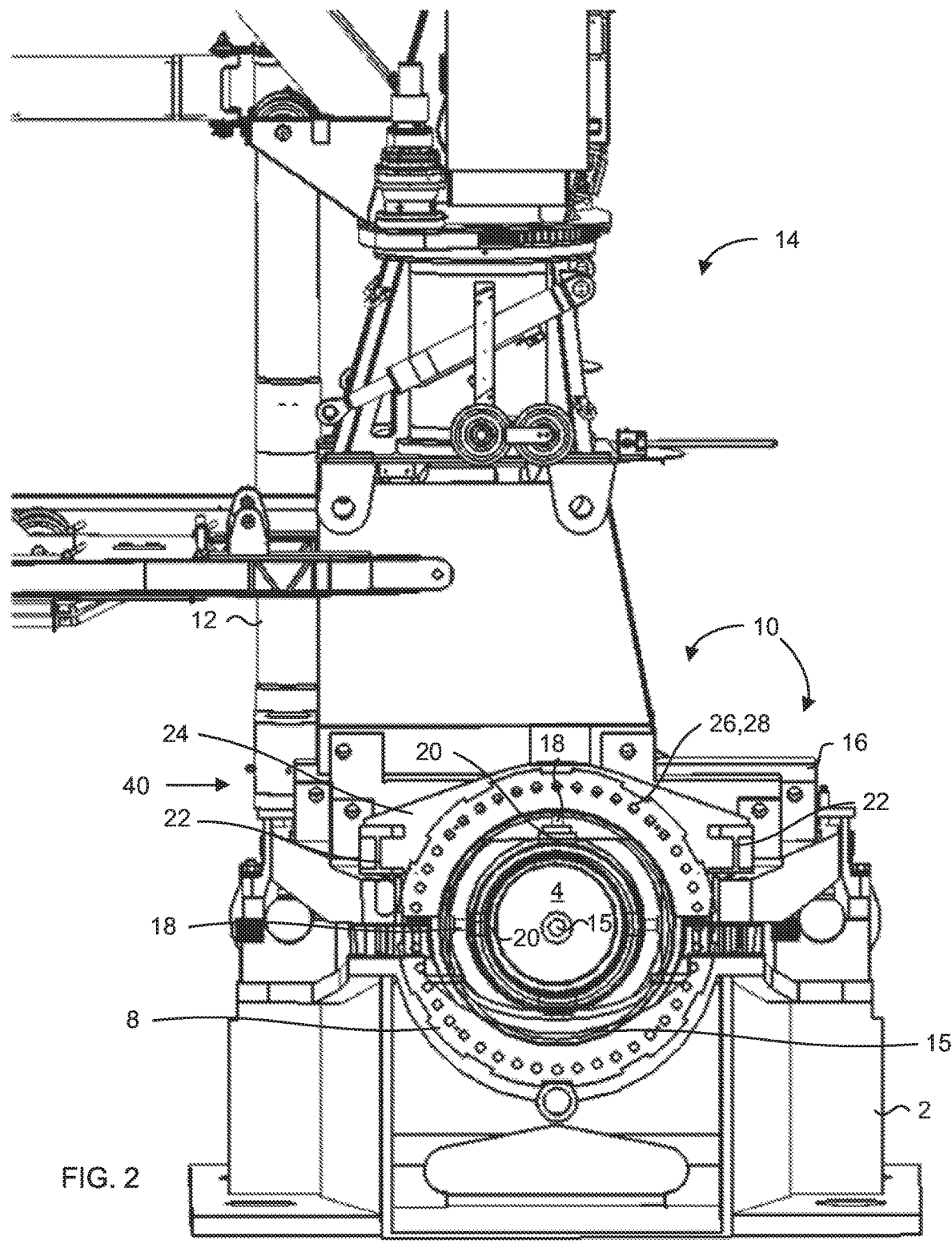
FIG. 2 is a more detailed perspective view from another angle of what is shown in FIG. 1, where the main shaft is made transparent, presenting the pressure mandrel with tap shoe belonging to the main shaft fixture according to the invention.

FIG. 2 shows what is seen in FIG. 1, but in an end view, seen from the rotor side of the shaft 4, and where the rotor 8 for reasons of clarity has been made transparent. As it appears from FIG. 2, the multi-part frame 14 and cross member 16 comprise in total four pressure mandrels 18 symmetrically placed around the main shaft 2, with tap shoes 20 that are engaged onto the main shaft 4 in order to fix it in place.

The pressure mandrels 18 may be comprised of hydraulically driven pistons whose free ends comprise the tap shoes 20, but may also be executed in other manners, where they are moved manually between the active position where the tap shoes 20 are engaged with the main shaft 4 and the passive, withdrawn position.

Figure 3:
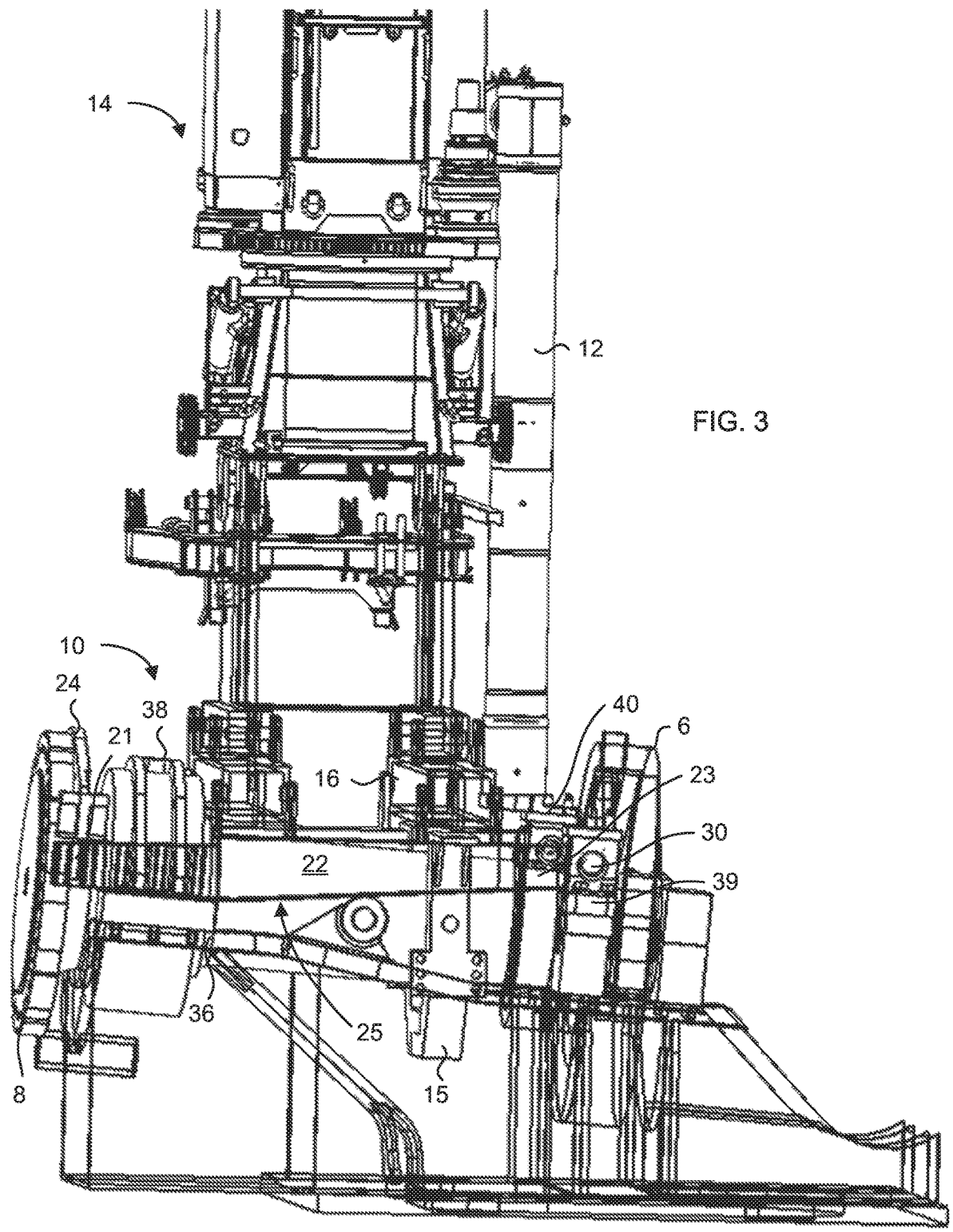
FIG. 3 is a more detailed perspective view from another angle of what is shown in FIG. 1, presenting the actuators for raising the main shaft, where the main shaft is made transparent.

As it appears from FIG. 3, the main shaft fixture 10 comprises two parallel passing first beams 22, one on each side of the main shaft 4. In first ends of each first beam 22 nearest to the rotor 8, a rotor lock is fastened in the form of a flange element 24, the hole circle geometry 26 of which is similar to the hole circle geometry 28 of the rotor 8 over part of the periphery of the rotor. For locking of the rotor 8, the holes 7 in the rotor 8 and the holes 9 in the flange element 24 are brought to overlap, and subsequently, bolts are inserted through the overlapping holes, which are tightened with nuts, after which the rotor 8 is fixed/locked by the flange element 24.

The other end of the parallel passing first beams 22 (that nearest to the gear box 6) are pivotally anchored on horizontally oriented bearing bolt 30, on a bracket 32, which is fastened to the bottom frame 2. The parallel passing first beams 22 are mutually connected with second cross members 34, on which bracket facilities 23 are seen for a self-hoisting crane 14 with a ground-based winch (not shown).

As it appears in FIGS. 1 & 3, an actuator 36 is located between the bottom frame 2 and the parallel passing first beams 22. Activation of the actuator 36 will result in a change of the distance between the bottom frame 2 and the first beams 22, in which the flange element 24 is suspended, which will cause the flange element 24 and the rotor 8 and thereby the main shaft 4 to be raised, which will result in the possibility to replace the main shaft's bearing 38 without the necessity of hoisting the main shaft 4 down to the ground, which is quite time-saving when the main shaft bearing 38 has to be repaired or replaced.

In FIG. 1, it is moreover shown how the main shaft fixture 10 comprises mounting facilities 40 for the lightweight crane 12.

Figure 4:
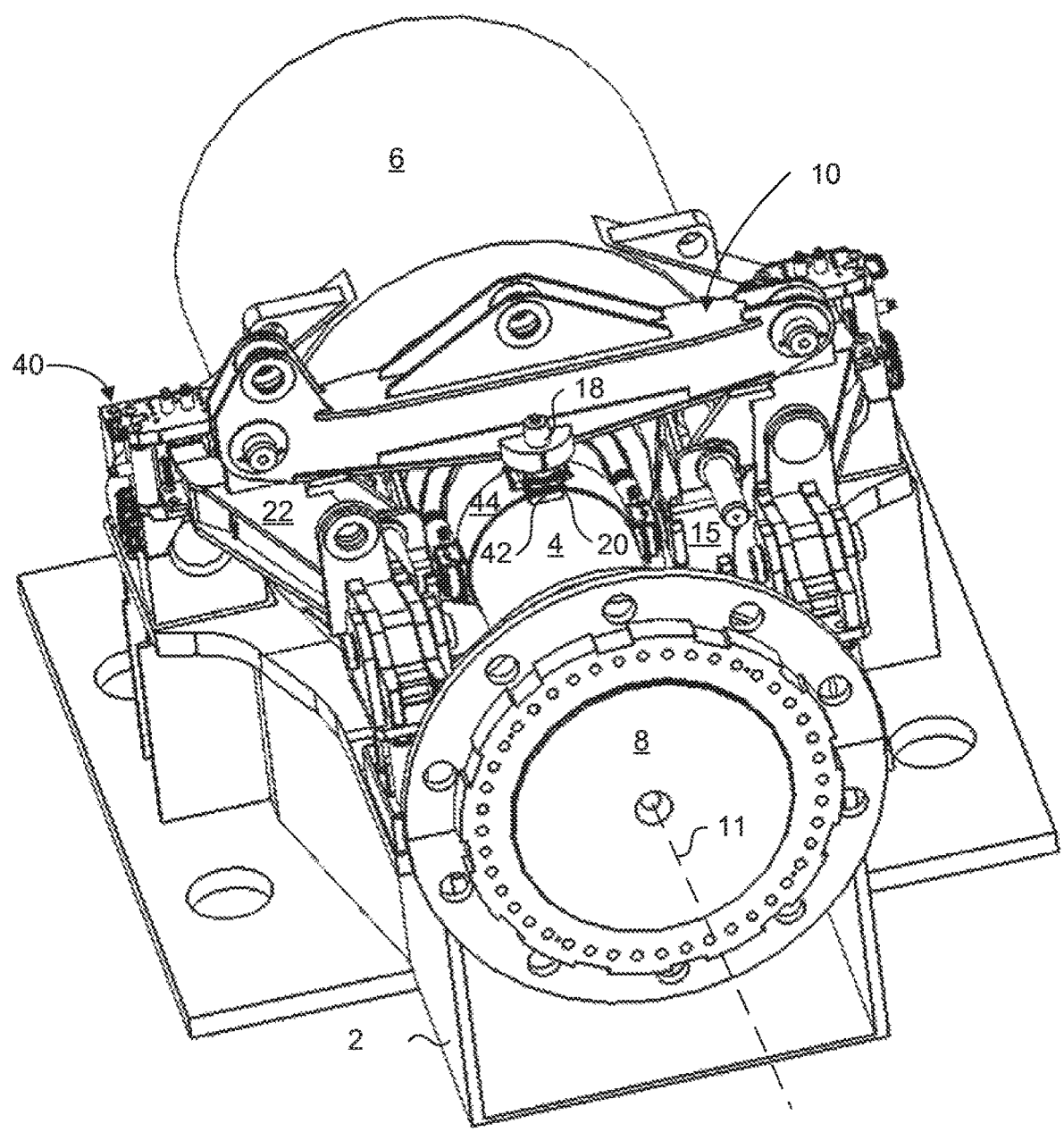
FIG. 4 is a detailed perspective view of the main shaft fixture for a wind turbine, where the tap shoes and the main shaft are furnished with slide plates.
Figure 5:
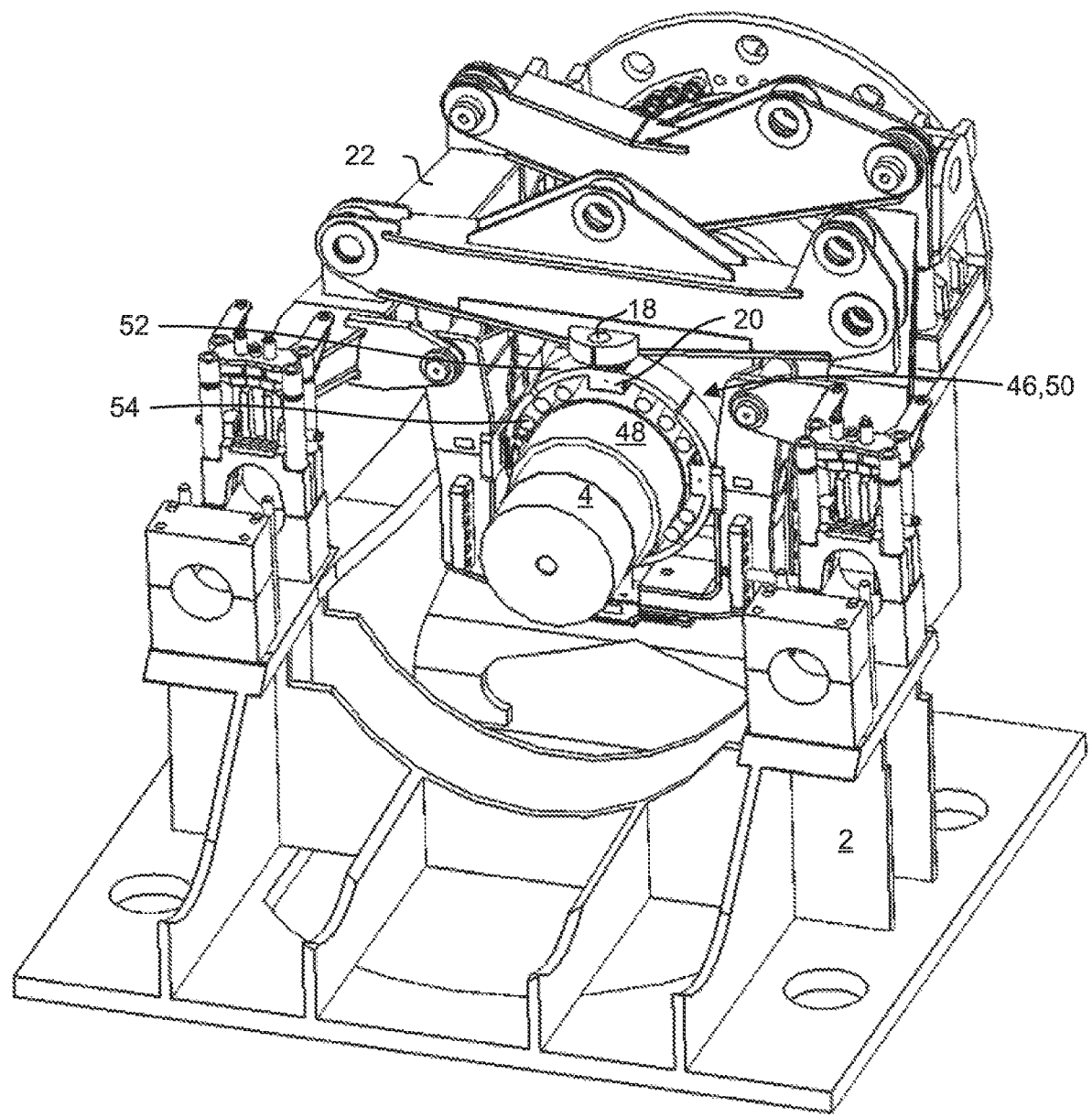
FIG. 5 is a detailed perspective view or the main shaft fixture for a wind turbine, where the slide plates are replaced by a multi-part needle bearing/roller bearing/ball bearing formed of a multi-part inner ring fastened to the main shaft and a therewith cooperating multi-part outer ring consisting of bowed sub-segments of the number of tap shoes mounted on the opposing side of the tap shoes facing the inner ring.

FIG. 4 shows an embodiment of the main shaft fixture according to the invention, which is specially suited for use for fixing the wind turbine main shaft 4 in position on the nacelle, but where rotation of the main shaft 4 is possible, in the active position of the pressure mandrels/tap shoes (18, 20), engaged with the main shaft.

As shown in FIG. 4, a slideway 42, 44 is located between the opposing sides of the tap shoes 20 facing the surface of the main shaft 4.

The slideway may be comprised of slide plates 42 that are fastened to the opposing free ends of the tap shoes 20 facing the main shaft 4, which in their active advanced position are engaged with the main shaft 4, but which alternatively may comprise a multi-part slide plate 44 cooperative working with the main shaft 4, for mounting on the main shaft 4, said multi-part slide plate 44 in its mounted state on the main shaft 4 cooperates with the tap shoes 20. It must be stated that the presence of the multi-part slide plate 44 on the main shaft 4 does not necessarily exclude the presence of the slide plates 42 and the tap shoes 20.

In a further embodiment, the main shaft fixture 10 is comprised of a multi-part needle bearing/roller bearing/ball bearing 46, formed of a multi-part inner ring 48 fastened on the main shaft as well as, a cooperating multi-part outer ring 50 formed of bowed sub-segments 52 equal to the number of tap shoes mounted on the opposing side of the tap shoes 20 facing the inner ring 48, which in the advanced position of the pressure mandrels form the outer ring 50 at a distance from the outer periphery of the multi-part inner ring 48, and where an appropriate number of needle rollers, rollers, or balls 54 (in the shown embodiment rollers 54) are arranged between the inner ring 48 and the outer ring 50, and where means (not shown) are present for retaining the needles/rollers or balls (54) in position between the inner ring 48 and outer ring 50.

The means mentioned for fastening of needle rollers/rollers/balls 54 may be formed of cooperating edge delineators in opposing sides of the inner ring 48 and the outer ring 50, alternatively as a means for holding between which the needle rollers/rollers/balls 54 are fastened.

The presence of the slide plates 42, 44, alternatively the multi-part needle bearing, roller bearing, ball bearing 46, involves the main shaft 4 being permitted to rotate simultaneously with it being fixed in its position during servicing of the wind turbine, which can serve a purpose namely for larger wind turbines.

The inventor has recognized that the main shaft fixture 10 can assume other embodiments than disclosed in the preceding and shown in the figures, however such do not change the inventive aspect that is comprised of specifying a main shaft fixture 10 of the given type that comprises adjustable pressure mandrels 18 with tap shoes 20, which causes the fixture 10 to be usable regardless of the geometry of the main shaft 4 on a wind turbine, and thus that such can be mounted without fixing the rotor 8 in place, and furthermore of combining the main shaft fixture with facilities 40 for mounting of a lightweight crane 12 and a self-hoisting crane 14 with a ground-based winch, respectively, as well as a rotor lock 24 and finally of furnishing the main shaft fixture 10 with actuators 36, enabling the main shaft 4 and the main shaft bearing 38 to be raised sufficiently from its bearing in the nacelle that it can be serviced or replaced.

What is claimed is:

1. Main shaft fixture for fixation of a main shaft on a wind turbine during execution of installation and repair work on heavy parts of a wind turbine, where the fixture is divided up into a number of sections for mounting on stable structural parts in a nacelle of a wind turbine, including a bottom frame of the nacelle, characterised in that the main shaft fixture comprises adjustable pressure mandrels with tap shoes, and the adjustable pressure mandrels being displaceable between a passive position where the tap shoes are configured to be located at a distance from a surface of the main shaft and an active position where the tap shoes are configured to be engaged with the main shaft and in that the main shaft fixture further comprises mounting facilities adapted for anchoring a crane on/in a nacelle of a wind turbine.

2. Main shaft fixture according to claim 1, characterized in that the adjustable pressure mandrels with tap shoes comprise at least three radial displaceable pressure mandrels, substantially symmetrical located around a centre axis of the main shaft, ends of the adjustable pressure mandrels facing the main shaft being furnished with the tap shoes.

3. Main shaft fixture, according to claim 1, characterised in, that the mounting facilities are adapted for anchoring a self-hoisting crane on/in a nacelle of a wind turbine and in that a winch of the self-hoisting crane is located on a ground surface near a foot of the wind turbine.

4. Main shaft fixture, according to claim 1, characterised in, that the adjustable pressure mandrels is provided with actuators for displacing and retaining the tap shoes in the passive position and the active position, respectively, alternatively in a selectable position between the passive and the active position.

5. Main shaft fixture, according to claim 1, characterised in, that the adjustable pressure mandrels consists of threaded bolts whose opposing free ends facing the main shaft are furnished with tap shoes, and the threaded bolts cooperates with threaded holes in relevant sections of the main shaft fixture.

6. Main shaft fixture, according to claim 1, characterised by a slideway lining being located between opposing sides of a surface of the main shaft and tap shoes.

7. Main shaft fixture according to claim 6, characterised in, that the slideway lining is configured so that of opposing free ends of the tap shoes facing the main shaft are provided with a slide plate which in the active position is engaged with the main shaft.

8. Main shaft fixture according to claim 7, characterised in that it comprises a multi-part slide plate cooperating with the main shaft for mounting on the main shaft, where the multi-part slide plate in its mounted position on the main shaft is cooperating with the tap shoes.

9. Main shaft fixture according to claim 1, characterised in, that it comprises one of a multi-part needle bearing, roller bearing, ball bearing consisting of a multi-part inner ring fastened to the main shaft, and a therewith cooperating multi-part outer ring consisting of bowed subsegments corresponding to a number of tap shoes, mounted on opposing side of the tap shoes facing an inner ring, which in the active position of the adjustable pressure mandrels form an outer ring at a distance from an outer periphery of the multi-part inner ring, and where an appropriate number of needle rollers, rollers, or balls are arranged between the inner ring and the outer ring, and where means are present for retaining needles, rollers, or balls in position between the inner ring and outer ring.

10. Main shaft fixture, according to claim 1, characterised in, that it comprises a rotor lock for fixation of a rotor of the wind turbine.

11. Main shaft fixture, according to claim 10, characterised in, that the rotor lock consists of a flange element, whose bolt circle geometry corresponds to a bolt circle geometry on the rotor, the flange element being fastened at the ends to a first end of two first beam-shaped brackets extending parallel with, and on each side of the main shaft, the beam shaped brackets belonging to the main shaft fixture, and where a second end of the beam-shaped brackets are pivotally mounted with horizontally oriented bolt connections, on other beam-shaped brackets belonging to the main shaft fixture, which are adapted to be anchored on the bottom frame of the nacelle.

12. Main shaft fixture, according to claim 11, characterised in, that at least one actuator is located nearest the rotor lock between the bottom frame of the nacelle and an adjacent side of the first beam-shaped brackets facing the bottom frame, the actuator is displaceable between a first passive outer position and an active outer position where the flange element is displaced vertically.

13. Assembly for installing and repairing heavy parts of a wind turbine arranged in a nacelle of a wind turbine, the assembly comprising a main shaft fixture according to claim 1, characterized in that a crane is mounted to the main shaft fixture via the mounting facilities of the main shaft fixture.

14. Main shaft fixture, according to claim 1, characterised in that the mounting facilities are adapted for anchoring a lightweight crane on/in a nacelle of a wind turbine.

15. Main shaft fixture for fixation of a main shaft on a wind turbine during execution of installation and repair work on heavy parts of a wind turbine, where the main shaft fixture is divided up into a number of sections for mounting on stable structural parts in a nacelle of a wind turbine, including a bottom frame of the nacelle, characterised in that,
the main shaft fixture comprises adjustable pressure mandrels with tap shoes, and the adjustable pressure mandrels being displaceable between a passive position where the tap shoes are configured to be located at a distance from a surface of the main shaft and an active position where the tap shoes are configured to be engaged with the main shaft, the adjustable pressure mandrels consisting of threaded bolts whose opposing free ends facing the main shaft are furnished with tap shoes, and the threaded bolts cooperates with threaded holes in relevant sections of the main shaft fixture, and in that the main shaft fixture further comprises mounting facilities adapted for anchoring a crane on/in a nacelle of a wind turbine.

16. Main shaft fixture for fixation of a main shaft on a wind turbine during execution of installation and repair work on heavy parts of a wind turbine, where the main shaft fixture is divided up into a number of sections for mounting on stable structural parts in a nacelle of a wind turbine, including a bottom frame of the nacelle, characterised in, that the main shaft fixture comprises adjustable pressure mandrels with tap shoes, and the adjustable pressure mandrels being displaceable between a passive position where the tap shoes are configured to be located at a distance from a surface of the main shaft and an active position where the tap shoes are configured to be engaged with the main shaft and in that the main shaft fixture further comprises mounting facilities adapted for anchoring a crane on/in a nacelle of a wind turbine, and further comprising a rotor lock for fixation of a rotor of the wind turbine, wherein the rotor lock consists of a flange element, whose bolt circle geometry corresponds to a bolt circle geometry on the rotor, the flange element being fastened to a first end of two first beam-shaped brackets extending parallel with, and on each side of the main shaft, the two first beam shaped brackets belonging to the main shaft fixture, and where a second end of the two first beam shaped brackets are pivotally mounted with horizontally oriented bolt connections, on other brackets belonging to the main shaft fixture, which are adapted to be anchored on the bottom frame of the nacelle.

17. Main shaft fixture, according to claim 16, wherein at least one actuator is located nearest the rotor lock between the bottom frame of the nacelle and an adjacent side of the first beam shaped brackets facing the bottom frame, the actuator is displaceable between a first passive outer position and an active outer position where the flange element is displaced vertically.

* * * * *

UNITED STATES PATENT AND TRADEMARK OFFICE
CERTIFICATE OF CORRECTION

PATENT NO. : 12,104,578 B2
APPLICATION NO. : 18/420859
DATED : October 1, 2024
INVENTOR(S) : Per E. Fenger Page 1 of 1

It is certified that error appears in the above-identified patent and that said Letters Patent is hereby corrected as shown below:

In the Specification

In Column 1, Line 15, in the CROSS-REFERENCE TO RELATED APPLICATIONS paragraph, after "their" delete "entirety".

In the Claims

In Column 8, Lines 7-8, in Claim 11, after "fastened" delete "at the ends".

Signed and Sealed this
Twenty-sixth Day of November, 2024

Katherine Kelly Vidal
*Director of the United States Patent and Trademark Office*